US011681715B2

(12) United States Patent
O'Hara et al.

(10) Patent No.: US 11,681,715 B2
(45) Date of Patent: Jun. 20, 2023

(54) DETERMINATION OF CANDIDATE FEATURES FOR DEVIATION ANALYSIS

(71) Applicant: BUSINESS OBJECTS SOFTWARE LTD., Dublin (IE)

(72) Inventors: Paul O'Hara, Dublin (IE); Malte Christian Kaufmann, Dublin (IE); Anirban Banerjee, Kilcullen (IE); Ian Denver, Bray (IE); Alan McShane, Raheny (IE)

(73) Assignee: BUSINESS OBJECTS SOFTWARE LTD., Dublin (IE)

( * ) Notice: Subject to any disclaimer, the term of this patent is extended or adjusted under 35 U.S.C. 154(b) by 121 days.

(21) Appl. No.: 17/342,812

(22) Filed: Jun. 9, 2021

(65) Prior Publication Data
US 2022/0398246 A1    Dec. 15, 2022

(51) Int. Cl.
*G06F 16/2458*    (2019.01)
*G06F 16/28*    (2019.01)

(52) U.S. Cl.
CPC ...... *G06F 16/2462* (2019.01); *G06F 16/2465* (2019.01); *G06F 16/285* (2019.01)

(58) Field of Classification Search
CPC . G06F 16/2462; G06F 16/2465; G06F 16/285
USPC ........................................................ 707/722
See application file for complete search history.

(56) References Cited

U.S. PATENT DOCUMENTS

2017/0102978 A1 *    4/2017 Pallath ................ G06F 11/0751

OTHER PUBLICATIONS

Communication: "Extended European Search Report", dated May 6, 2022 (May 6, 2022), European Patent Office, for European Application No. 21209830.5-1203, 8 pages.
(Continued)

*Primary Examiner* — Michael Pham
(74) *Attorney, Agent, or Firm* — Buckley, Maschoff & Talwalkar LLC

(57) ABSTRACT

Systems and methods include determination, determine, for each of a plurality of discrete features, of statistics for each discrete value of the discrete feature based on values of a continuous feature associated with the discrete value, determination, for each discrete feature, of first summary statistics based on the statistics determined for each discrete value of the discrete feature, determination, for each discrete feature, of a dissimilarity based on the first summary statistics determined for the discrete feature and on the statistics determined for each discrete value of the discrete feature, determination of candidate discrete features of the discrete features based on the determined dissimilarities, the candidate discrete features comprising less than all of the discrete features, determination, for each of the candidate discrete features, of second summary statistics based on values of the continuous feature associated with each discrete value of the candidate discrete feature, determine of a deviation score for each of the candidate discrete features based on the second summary statistics, and presentation of the candidate discrete features based on the determined deviation scores.

12 Claims, 6 Drawing Sheets

(56) References Cited

OTHER PUBLICATIONS

Jian, Sheng-yi et al., "Efficient feature selection based on correlation measure between continuous and discrete features", Information Processing Letters, vol. 116, No. 2, Jul. 17, 2015 (Jul. 17, 2015), ISSN: 0020-0190, DOI: 10.1016/J.IPL.2015.07.005, 13pgs.

* cited by examiner

310

| DiscrFeatA | DiscrFeatB | DiscrFeatC | DiscrFeatD |
|---|---|---|---|
| A1 | B3 | C2 | D3 |
| A2 | B1 | C1 | D2 |
| A2 | B4 | C3 | D5 |
| A1 | B1 | C3 | D6 |
| A1 | B2 | C1 | D1 |
| A3 | B4 | C2 | D7 |
| A2 | B4 | C4 | D4 |
| A3 | B3 | C1 | D3 |
| A2 | B3 | C2 | D5 |

320

| ContFeat1 |
|---|
| 4 |
| 8 |
| 7 |
| 6 |
| 4 |
| 2 |
| 3 |
| 4 |
| 6 |

| DiscrFeatA Value | min | max | mean | variance |
|---|---|---|---|---|
| A1 | 4 | 6 | 4.67 | 1.33 |
| A2 | 3 | 8 | 6 | 4.67 |
| A3 | 2 | 4 | 3 | 2 |
| Avg | 3 | 6 | 4.56 | 2.67 |

| DiscrFeatB | sum |
|---|---|
| B1 | 14 |
| B2 | 4 |
| B3 | 14 |
| B4 | 12 |
| mean | 11 |
| α | 14 |

FIG. 5

DETERMINATION OF CANDIDATE FEATURES FOR DEVIATION ANALYSIS

BACKGROUND

Today's organizations collect and store large amounts of data at an ever-increasing rate. Examples of these large data flows include sensor data and financial data. The Internet of Things has greatly increased the number of deployed sensors, which has exponentially increased the amount of sensor data generated thereby. The finance industry generates huge quantities of data to facilitate predictions, pattern recognition and strategic planning.

Performing calculations upon or identifying patterns within these large sets of data can be time-consuming or even infeasible. Modern data analytics attempts to assist humans in efficiently understanding collected data. For example, data mining uses machine learning and/or statistical techniques to discover potentially useful patterns within large amounts of data stored in databases, data warehouses, or other information repositories.

Deviation analysis is a type of data mining which may include determining the deviation between a selected continuous feature (e.g., Sales) and a discrete feature (e.g., Color, Type) of a set of data. For example, deviation analysis may determine whether all discrete values (Blue, Red, Green) of a discrete feature (Color) behave in a roughly similar manner with respect to a continuous feature (Sales). If not, deviation analysis may further indicate a degree to which any one discrete value deviates from the norm (e.g., Blue contributes to Sales much more strongly than Red or Green). Deviation analysis may be performed for each of several discrete features with respect to a same continuous feature in order to determine which discrete feature includes the most-deviating discrete values.

Mining deviation relationships between a selected continuous feature and the discrete features of a large set of data can be computationally expensive, particularly in a case that the set of data contains many discrete features, each of which contains many discrete values. Improved systems for performing deviation analysis are desired, which require fewer computational resource requirements than conventional systems while producing a suitable quality of deviation analysis.

BRIEF DESCRIPTION OF THE DRAWINGS

FIG. 3 comprises tabular representations of selected discrete feature data and continuous feature data according to some embodiments.

FIG. 4 illustrates statistics determined for each discrete value of a discrete feature according to some embodiments.

FIG. 5 illustrates statistics determined for a discrete feature for input to deviation analysis according to some embodiments.

DETAILED DESCRIPTION

The following description is provided to enable any person in the art to make and use the described embodiments and sets forth the best mode contemplated for carrying out some embodiments. Various modifications, however, will be readily-apparent to those in the art.

As used herein, a feature refers to an attribute of a set of data. In the case of tabular data, each column may be considered as representing a respective feature of the data, while each row is an instance of values of each feature of the data. A continuous feature is represented using numeric data having an infinite number of possible values within a selected range. A discrete feature is represented by data having a finite number of possible values, hereinafter referred to as discrete values. Temperature is an example of a continuous feature, while days of the week and gender are examples of discrete features.

Some embodiments provide automated and efficient selection of discrete features of a set of data to which deviation analysis is then applied. Embodiments may therefore avoid performing deviation analysis on non-selected discrete features, and the associated resource consumption, while providing a result similar to that which would be produced if deviation analysis were applied to all discrete features of the set of data.

Candidate feature selection attempts to identify candidate features having higher likelihoods of producing anomalous deviation scores with respect to a given continuous feature, and therefore exhibiting a stronger informational relationship with the given continuous feature. This identification may improve the quality and accuracy of deviation analysis subsequently performed on the identified candidate features. Candidate feature selection according to some embodiments may utilize statistics derived relative to the discrete values of each discrete feature. Although embodiments described below subject the identified candidate features to subsequent deviation analysis, embodiments are not limited thereto.

Figure 1:
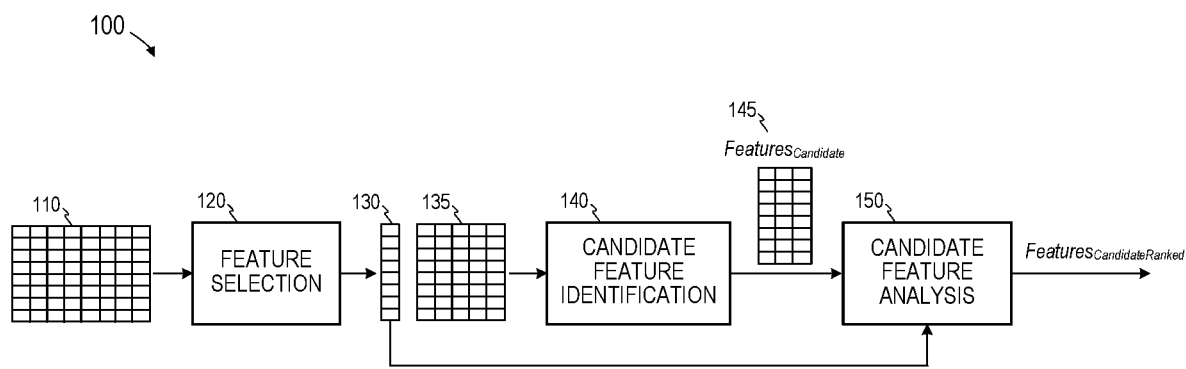
FIG. 1 is a block diagram of an architecture to perform deviation analysis on a plurality of discrete features with respect to a continuous feature according to some embodiments.

FIG. 1 is a block diagram of architecture 100 to perform deviation analysis on a plurality of discrete features with respect to a continuous feature according to some embodiments. The illustrated components may be implemented using any suitable combination of computing hardware and/or software that is or becomes known. In some embodiments, two or more components are implemented by a single computing device. Two or more components of FIG. 1 may be co-located. One or more components may be implemented as a cloud service (e.g., Software-as-a-Service, Platform-as-a-Service). A cloud-based implementation of any components of FIG. 1 may apportion computing resources elastically according to demand, need, price, and/or any other metric.

Data 110 may comprise values of a database table. More specifically, data 110 may comprise rows of database table, with each row including a value of a corresponding database column, or feature. Data 110 consists of at least one continuous feature and one or more discrete features.

Feature selection component 120 identifies a continuous feature and, optionally, eon or more discrete features of data 110. The continuous feature and one or more discrete features may be selected by a user (not shown). In some embodiments, a user selects no discrete features, in which case feature selection component 120 selects all discrete features of data 110. In the FIG. 1 example, column 130 of data 110 includes values of a continuous feature selected by feature selection component 120 and columns 135 includes values of discrete features selected by feature selection component 120.

Candidate feature identification component 140 determines a dissimilarity score for each selected discrete feature. The dissimilarity score for a discrete feature is determined based on statistics determined for each discrete value of the discrete feature. As will be described below, the statistics are determined based on values of the continuous feature which correspond to each discrete value.

The dissimilarity score determined for a discrete feature represents a likelihood that a significant deviation score will be determined for the discrete feature by candidate feature analysis component 150. According to some embodiments, candidate feature identification component 140 outputs the discrete features associated with the N highest dissimilarity scores as candidate discrete features 145.

Candidate feature analysis component 150 receives the selected continuous feature 130 and candidate discrete features 145 and applies a deviation analysis algorithm thereto to produce a deviation score for each candidate discrete feature 145. According to some embodiments, candidate feature analysis component 150 determines the deviation score for a candidate discrete feature 145 based on statistics which are in turn determined based on values of the continuous feature which correspond to each discrete value of the candidate discrete feature 145. The deviation score indicates a deviational relationship of each candidate discrete feature 145 to the selected continuous feature 130. Candidate discrete features 145 are then ordered and output based on their respective deviation scores.

Embodiments may produce an ordered list of discrete features, and respective deviation scores, more quickly and/or using less resources than systems in which deviation scores are determined for all selected discrete features. In particular, the initial determination of candidate discrete features from a set of selected discrete features allows avoidance of deviation score determination for those discrete features which are likely not associated with significant deviation with respect to the subject continuous feature.

Figure 2:
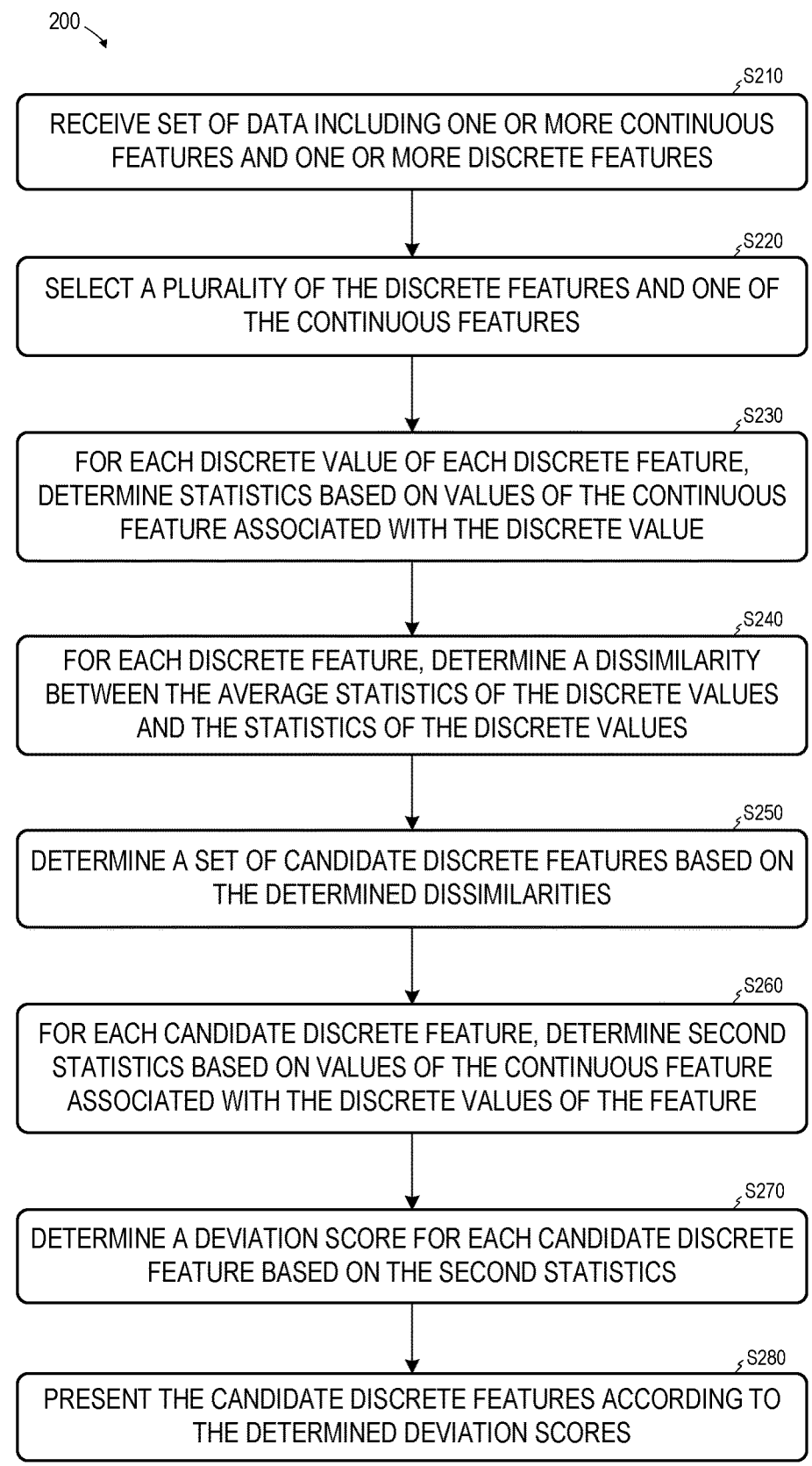
FIG. 2 comprises a flow diagram of a process to perform deviation analysis on a plurality of discrete features with respect to a continuous feature according to some embodiments.

FIG. 2 is a flow diagram of process 200 to perform deviation analysis on a plurality of discrete features with respect to a continuous feature according to some embodiments. Process 200 and the other processes described herein may be performed using any suitable combination of hardware and software. Program code embodying these processes may be stored by any non-transitory tangible medium, including a fixed disk, a volatile or non-volatile random access memory, a DVD, a Flash drive, or a magnetic tape, and executed by any one or more processing units, including but not limited to a processor, a processor core, and a processor thread. Embodiments are not limited to the examples described below.

Process 200 may be initiated by a request to determine the top contributors to a particular continuous feature of a set of data. Such a request may be received from an end-user via data analytics application.

The set of data is received at S210, in a structured form such as a tabular format. The structured format facilitates definition of one or more continuous features and one or more discrete features within the data.

A plurality of the discrete features and one of the continuous features is selected at S220. The continuous features is a feature with respect to which the deviation of each selected discrete feature is to be determined and ranked. In some embodiments, if no discrete features are selected by a user at S220, then all discrete features of the data are assumed to be selected at S220.

Statistics are determined at S230 for each discrete value of each discrete feature. The statistics for a given discrete value are determined based on values of the continuous feature which are associated with the discrete value. Examples of statistics determined at S230 include but are not limited to min, max, count, mean and variance.

FIG. 3 illustrates columns 310 of four discrete features and column 320 of a continuous feature selected at S220 according to some embodiments. Columns 310 and 320 may comprise columns of a set of data which was received at S210 and which includes one or more other columns of discrete or continuous features. Each column includes values associated with its respective feature. Each value is a discrete value in the case of the discrete features of columns 310, and a continuous value in the case of the continuous feature of column 310.

As mentioned above, statistics are determined at S230 for each discrete value of each discrete feature based on values of the continuous feature which are associated with the discrete values. Table 410 illustrates determination of statistics for discrete values A1, A2, A3 of the discrete feature DiscrFeatA, based on the values of continuous feature ContFeat1 which are associated with respective ones of discrete values A1, A2, A3.

Row 412 of table 410 shows statistics determined at S230 for discrete value A1 of discrete feature DiscrFeatA. As shown in FIG. 3, discrete value A1 of discrete feature DiscrFeatA is associated with values 4, 6, and 4 of continuous feature ContFeat1. Row 412 shows the min (i.e., 4), the max (i.e., 6), the mean (i.e., 4.67) and the variance (1.33) of these associated values. Similarly, discrete value A2 of discrete feature DiscrFeatA is associated with values 8, 3, 7 and 6 of continuous feature ContFeat1. Row 414, associated with discrete value A2, shows the min (i.e., 3), the max (i.e., 8), the mean (i.e., 6) and the variance (4.67) of these associated values. Lastly, discrete value A3 of discrete feature DiscrFeatA is associated with values 2 and 4 of continuous feature ContFeat1 and corresponding row 416 shows the min (i.e., 2), the max (i.e., 4), the mean (i.e., 3) and the variance (i.e., 2) of these associated values. According to some embodiments, statistics are determined similarly at S230 for each discrete value of discrete features DiscrFeatB, DiscrFeatC, and DiscrFeatD.

A dissimilarity score is determined for each discrete feature at S240 based on the statistics determined for each discrete value at S230. According to some embodiments, the dissimilarity score for a discrete feature is determined based on the averages of the statistics determined for each discrete value of the discrete feature, and the dissimilarity of the statistics determined for each discrete value to the averages. While an average of the discrete value-specific statistics is described herein, embodiments may employ another statistical summary of the discrete value-specific statistics.

Row 420 of FIG. 4 illustrates the averages of each statistic determined for the discrete values of discrete feature DiscrFeatA. S240 may comprise the determination of a score representing the distances from the statistics of each row of table 410 to the average statistics of row 420. The score may represent a maximum distance, an average distance, or any other value determined based on the determined distances.

The distances may be computed as cosine dissimilarities, but embodiments are not limited thereto.

The cosine similarity algorithm measures the similarity between two vectors (e.g., lists of values). This similarity is defined as the cosine angle between the two vectors and indicates a degree to which the two vectors are pointing in the same direction.

Generally, $$\text{cosine similarity } (X, Y) = \frac{X \cdot Y}{\|X\| * \|Y\|}, \text{ where } X \cdot Y = \sqrt{\sum_{i=1}^{n} X_i * Y_i},$$

$$\|X\| = \sqrt{\sum_{i=1}^{n} X_i^2}, \text{ and } \|Y\| = \sqrt{\sum_{i=1}^{n} Y_i^2}.$$

S240 may therefore comprise determining cosine similarities between the average statistics associated with a discrete feature (e.g., the values of row 420) and the statistics associated with each discrete value of the discrete feature (e.g., the values of each of rows 412, 414, 416). The dissimilarity score is then determined to be the minimum of all the cosine similarities determined for the discrete feature.

A set of candidate discrete features is determined at S250 based on the determined dissimilarity scores. In this regard, a dissimilarity score is determined at S240 for each discrete feature selected at S220. In some embodiments, the selected discrete features associated with the N largest dissimilarity scores are determined as the candidate discrete features at S250. N may be any desired number, and may be selected to limit an amount of processing resources required to perform the below-described deviation analysis on the candidate discrete features.

Second statistics are determined at S260 for each candidate discrete feature in preparation for deviation analysis at S270. The second statistics determined for a discrete feature are based on values of the selected continuous feature which are associated with each discrete value of the discrete feature. In some embodiments of S260, the continuous values associated with each discrete value of a discrete feature are summed, and the second statistics for the discrete feature are determined based on the sums.

FIG. 5 illustrates the determination of second statistics for a discrete feature at S260 according to some embodiments. Table 510 shows a sum of the values of continuous feature ContFeat1 associated with each of discrete values B1, B2, B3, B4 of discrete feature DiscrFeatB. According to this example, the second statistics of discrete feature DiscrFeatB include the mean (11) of the sums and a value of α (e.g., the min of the sums if the mean is negative, or the max of the sums if the mean is positive). Any type of second statistics for a discrete feature may be determined at S260 based on values of the selected continuous feature which are associated with each discrete value of the discrete feature. The second statistics are those which are required as inputs to the particular deviation analysis algorithm to be employed at S270.

A deviation score is determined for each discrete feature at S270. The deviation scores are determined based on the second statistics determined for each discrete feature at S260. According to one non-exhaustive embodiment, determination of a deviation score for a discrete feature is as follows:

$$\text{deviation score}_{discrete\ feature} = \frac{\alpha - \text{mean}_{sum\ discrete\ values}}{\text{mean}_{sum\ discrete\ values}}$$

where, as described above:

$$\alpha = \begin{cases} \max\left(\{f(x):x = \text{ sum discrete value}_i, \ldots \text{ sum discrete value}_n\}\right), \\ \qquad\qquad \text{mean}_{sum\ discrete\ values} \geq 0 \\ \min\left(\{f(x):x = \text{ sum discrete value}_i, \ldots \text{ sum discrete value}_n\}\right), \\ \qquad\qquad \text{mean}_{sum\ discrete\ values} < 0 \end{cases}$$

According to the above example, the deviation score determined for discrete feature DiscrFeatB is (14−11)/11==0.273.

At S280, the candidate discrete features are presented according to their respective deviation scores. For example, the candidate discrete features may be ordered from highest deviation score to lowest deviation score, where a larger deviation score indicates larger deviational behavior between discrete values of the discrete feature.

Figure 6:
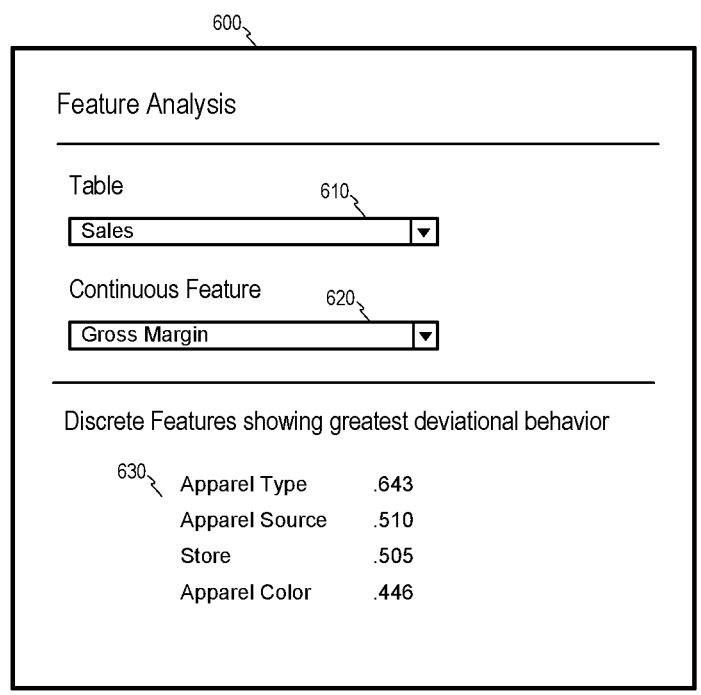
FIG. 6 is an outward view of a user interface presenting proportional contributions of each of a plurality of discrete values to an output value according to some embodiments.

FIG. 6 illustrates user interface 600 of a data analysis application according to some embodiments. A user may execute a Web browser to access the data analysis application via HyperText Transfer Protocol and receive user interface 600 in return.

User interface 600 includes drop-down field 610 for selecting a table to which the user has access. Selection of a table results in population of drop-down menu 620 with a list of selectable continuous features of the selected table. Once a continuous feature is selected, a process such as process 200 may be executed to determined candidate discrete features of the selected table, and to then determine deviation scores for each candidate discrete feature. Area 630 of user interface 600 shows such candidate features ordered according to deviation score. Embodiments are not limited to user interface 600. Embodiments may utilize any interface metaphor for selecting a continuous feature of a table (and optionally one or more discrete features of the table) and for presenting candidate discrete features based on corresponding determined deviation scores.

Figure 7:
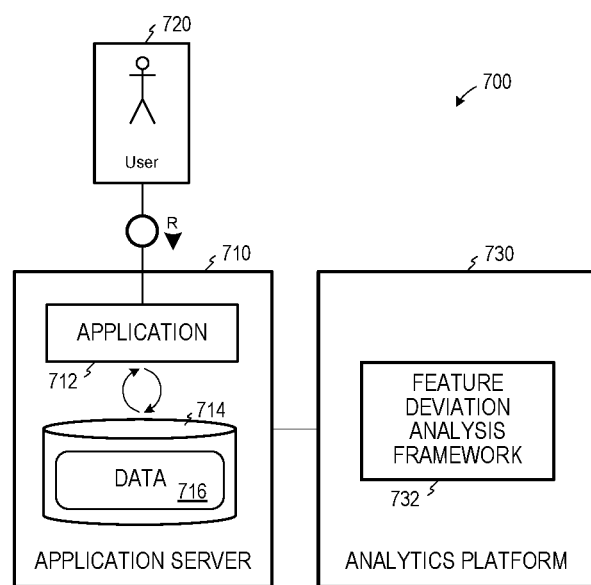
FIG. 7 illustrates a system to provide data analytics according to some embodiments.

FIG. 7 illustrates system 700 to provide data analytics including data mining to applications according to some embodiments. Application server 710 may comprise an on-premise or cloud-implemented server providing an execution platform and services to applications such as application 712. Application 712 may comprise program code executable by a processing unit to provide functions to users such as user 720 based on coded logic and on data 716 stored in data store 714. Data 716 may comprise tabular data stored in a columnar or row-based format, object data or any other type of data that is or becomes known. Data store 714 may comprise any suitable storage system such as database system, which may be partially or fully remote from application server 710, and may be distributed as is known in the art.

According to some embodiments, user 720 may interact with application 712 (e.g., via a Web browser executing a front-end UI application associated with application 712) to request deviation analysis of discrete features in view of a continuous feature of a table of data 716. Application 712 may access analytics platform 730 to serve this request. Analytics platform 730 may also be implemented by on-premise or cloud-based servers.

Analytics platform 730 includes program code of feature deviation analysis framework 732, which may be executed to determine candidate discrete features and a deviation score for each candidate discrete features as described herein. Analytics platform 730 may provide the candidate discrete features and deviation scores to application 712 for subsequent presentation to user 720. Analytics platform 730 may provide additional functionality to applications, such as but not limited to machine learning model training and inference.

Figure 8:
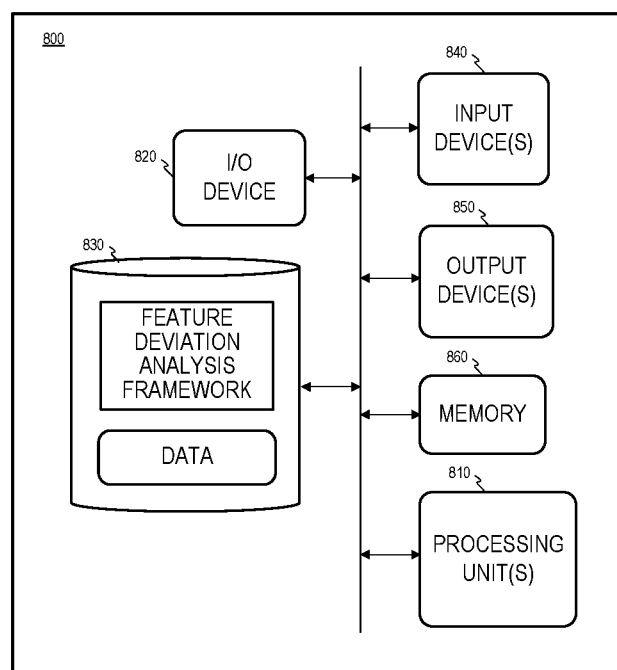
FIG. 8 is a block diagram of a hardware system for determining proportional contributions of each of a plurality of discrete values to an output value according to some embodiments.

FIG. 8 is a block diagram of a hardware system to determine candidate discrete features and corresponding deviation scores according to some embodiments. Hardware system 800 may comprise a general-purpose computing apparatus and may execute program code to perform any of the functions described herein. Hardware system 800 may be implemented by a distributed cloud-based server and may comprise an implementation of analytics platform 730 in some embodiments. Hardware system 800 may include other unshown elements according to some embodiments.

Hardware system 800 includes processing unit(s) 810 operatively coupled to I/O device 820, data storage device 830, one or more input devices 840, one or more output devices 850 and memory 860. I/O device 820 may facilitate data exchange with external devices, such as an external network, the cloud, or data storage device. Input device(s) 840 may comprise, for example, a keyboard, a keypad, a mouse or other pointing device, a microphone, knob or a switch, an infra-red (IR) port, a docking station, and/or a touch screen. Input device(s) 840 may be used, for example, to enter information into hardware system 800. Output device(s) 850 may comprise, for example, a display (e.g., a display screen) a speaker, and/or a printer.

Data storage device 830 may comprise any appropriate persistent storage device, including combinations of magnetic storage devices (e.g., magnetic tape, hard disk drives and flash memory), optical storage devices, Read Only Memory (ROM) devices, and RAM devices, while memory 860 may comprise a RAM device.

Data storage device 830 stores program code of a feature deviation analysis framework which is executable by processing unit(s) 810 to cause hardware system 800 to implement any of the components and execute any one or more of the processes described herein. Embodiments are not limited to execution of these processes by a single computing device. Data storage device 830 may also store data and other program code for providing additional functionality and/or which are necessary for operation of hardware system 800, such as device drivers, operating system files, etc.

The foregoing diagrams represent logical architectures for describing processes according to some embodiments, and actual implementations may include more or different components arranged in other manners. Other topologies may be used in conjunction with other embodiments. Moreover, each component or device described herein may be implemented by any number of devices in communication via any number of other public and/or private networks. Two or more of such computing devices may be located remote from one another and may communicate with one another via any known manner of network(s) and/or a dedicated connection. Each component or device may comprise any number of hardware and/or software elements suitable to provide the functions described herein as well as any other functions. For example, any computing device used in an implementation some embodiments may include a processing unit to execute program code such that the computing device operates as described herein.

Embodiments described herein are solely for the purpose of illustration. Those in the art will recognize other embodiments may be practiced with modifications and alterations to that described above.

What is claimed is:

1. A system comprising:
a memory storing processor-executable program code; and
a processing unit to execute the processor-executable program code to cause the system to:
receive data including a first continuous feature and a plurality of discrete features, the first continuous feature associated with a plurality of continuous values and each of the plurality of discrete features associated with a plurality of discrete values;
determine, for each of the plurality of discrete features, statistics for each discrete value of the discrete feature based on values of the continuous feature associated with the discrete value;
determine, for each discrete feature, first summary statistics based on the statistics determined for each discrete value of the discrete feature;
determine, for each discrete feature, a dissimilarity by determination of a similarity between the first summary statistics determined for the discrete feature and the statistics determined for each of the discrete values of the discrete feature, and determination of the dissimilarity as a minimum of the determined similarities;
determine candidate discrete features of the plurality of discrete features based on the determined dissimilarities, the candidate discrete features comprising less than all of the plurality of discrete features;
determine, for each of the candidate discrete features, second summary statistics based on values of the continuous feature associated with each discrete value of the candidate discrete feature;
determine a deviation score for each of the candidate discrete features based on the second summary statistics; and
transmit the candidate discrete features for display based on the determined deviation scores.

2. The system according to claim 1, wherein determination of the second summary statistics for a first candidate discrete feature comprises determination, for each discrete value of the first candidate discrete feature, of a sum of values of the continuous feature associated with the discrete value, and determination of the second summary statistics based on the determined sums.

3. The system according to claim 2, wherein the determined similarities are cosine similarities.

4. The system according to claim 1, wherein the determined similarities are cosine similarities.

5. A method comprising:
receiving data including a first continuous feature and a plurality of discrete features, the first continuous feature associated with a plurality of continuous values and each of the plurality of discrete features associated with a plurality of discrete values;
determining, for each of the plurality of discrete features, statistics for each discrete value of the discrete feature based on values of the continuous feature associated with the discrete value;
determining, for each discrete feature, first summary statistics based on the statistics determined for each discrete value of the discrete feature;
determining, for each discrete feature, a dissimilarity by determining a similarity between the first summary statistics determined for the discrete feature and the statistics determined for each of the discrete values of the discrete feature, and determining the dissimilarity as a minimum of the determined similarities;

determining candidate discrete features of the plurality of discrete features based on the determined dissimilarities, the candidate discrete features comprising less than all of the plurality of discrete features;

determining, for each of the candidate discrete features, second summary statistics based on values of the continuous feature associated with each discrete value of the candidate discrete feature;

determining a deviation score for each of the candidate discrete features based on the second summary statistics; and transmitting the candidate discrete features for display based on the determined deviation scores.

6. The method according to claim 5, wherein determination of the second summary statistics for a first candidate discrete feature comprises determination, for each discrete value of the first candidate discrete feature, of a sum of values of the continuous feature associated with the discrete value, and determination of the second summary statistics based on the determined sums.

7. The A-method according to claim 6, wherein the determined similarities are cosine similarities.

8. The method according to claim 5, wherein the determined similarities are cosine similarities.

9. A non-transitory medium storing processor-executable program code executable by a processing unit of a computing system to cause the computing system to:

receive data including a first continuous feature and a plurality of discrete features, the first continuous feature associated with a plurality of continuous values and each of the plurality of discrete features associated with a plurality of discrete values;

determine, for each of the plurality of discrete features, statistics for each discrete value of the discrete feature based on values of the continuous feature associated with the discrete value;

determine, for each discrete feature, first summary statistics based on the statistics determined for each discrete value of the discrete feature;

determine, for each discrete feature, a dissimilarity by determination of a similarity between the first summary statistics determined for the discrete feature and the statistics determined for each of the discrete values of the discrete feature, and determination of the dissimilarity as a minimum of the determined similarities;

determine candidate discrete features of the plurality of discrete features based on the determined dissimilarities, the candidate discrete features comprising less than all of the plurality of discrete features;

determine, for each of the candidate discrete features, second summary statistics based on values of the continuous feature associated with each discrete value of the candidate discrete feature;

determine a deviation score for each of the candidate discrete features based on the second summary statistics; and transmit the candidate discrete features for display based on the determined deviation scores.

10. The medium according to claim 9, wherein determination of the second summary statistics for a first candidate discrete feature comprises determination, for each discrete value of the first candidate discrete feature, of a sum of values of the continuous feature associated with the discrete value, and determination of the second summary statistics based on the determined sums.

11. The medium according to claim 10, wherein the determined similarities are cosine similarities.

12. The medium according to claim 9, wherein the determined similarities are cosine similarities.

* * * * *